(12) United States Patent
Sakai et al.

(10) Patent No.: US 6,545,771 B1
(45) Date of Patent: Apr. 8, 2003

(54) FACSIMILE APPARATUS AND INFORMATION PRINTING METHOD OF FACSIMILE APPARATUS

(75) Inventors: Yoichi Sakai, Hachioji (JP); Masao Sugiyama, Chiba (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/388,933

(22) Filed: Sep. 2, 1999

(30) Foreign Application Priority Data

Sep. 2, 1998 (JP) .......................................... 10-248643

(51) Int. Cl.⁷ .............................................. G06K 15/00
(52) U.S. Cl. ........................................ 358/1.9; 358/501
(58) Field of Search ................................ 358/400, 401, 358/405, 500, 501, 1.9

(56) References Cited

U.S. PATENT DOCUMENTS

| | | | |
|---|---|---|---|
| 4,862,254 A | 8/1989 | Takada | 358/78 |
| 5,296,933 A | 3/1994 | Nakatsuji | 358/400 |
| 5,440,408 A | 8/1995 | Tomita | 358/468 |
| 5,818,966 A | 10/1998 | Prasad et al. | 382/232 |
| 6,005,673 A | * 12/1999 | Murai | 358/434 |

FOREIGN PATENT DOCUMENTS

| | | | | |
|---|---|---|---|---|
| DE | 196 02 129 A1 | | 9/1996 | G06K/15/02 |
| EP | 332103 | * | 9/1989 | H04N/1/46 |
| EP | 0984617 | * | 8/2000 | H04N/1/32 |
| GB | 2 307 824 A | | 6/1997 | H04N/1/32 |
| JP | 2-301259 | | 12/1990 | H04N/1/00 |
| JP | 4-220864 | | 8/1992 | H04N/1/00 |
| JP | 4-270548 | | 9/1992 | H04N/1/00 |
| JP | 05091223 | * | 4/1993 | H04N/1/00 |
| JP | 5-244364 | | 9/1993 | H04N/1/04 |
| JP | 06125470 | * | 5/1994 | H04N/1/46 |
| JP | 10023273 | * | 1/1998 | H04N/1/46 |
| JP | 10-107980 | * | 4/1998 | H04M/11/00 |

* cited by examiner

Primary Examiner—Jerome Grant, II
(74) Attorney, Agent, or Firm—Birch, Stewart, Kolasch & Birch, LLP (57) ABSTRACT

An object of the present invention is to discriminate received information from one and same originator visually and readily. A CPU detects identification information of the originator in receiving a facsimile. It also selects identification information which coincides with the identification information detected among identification information of originators stored in a printing color table in a RAM in advance and selects a printing color corresponding to the identification information. A signal generating circuit generates an index signal which instructs to print an index mark in a selected printing color. The CPU controls an operation of a color printer so as to print the index mark in a predetermined color based on the index signal together with image information. It is possible to discriminate information transmitted from a predetermined terminal by selecting the recording sheet on which the index mark of the predetermined printing color is printed out of the mixed recording sheets. The recording sheet may be readily selected visually because the information is distinguished by the colors.

10 Claims, 9 Drawing Sheets

TRANSMITTED ORIGINAL (MONOCHROME)      RECEIVING RECORDING PAPER

FACSIMILE APPARATUS AND INFORMATION PRINTING METHOD OF FACSIMILE APPARATUS

BACKGROUND OF THE INVENTION

1. Field of the Invention

The present invention relates to a facsimile apparatus having a color printing function and an information printing method of the facsimile apparatus.

2. Description of the Related Art

Figure 10:
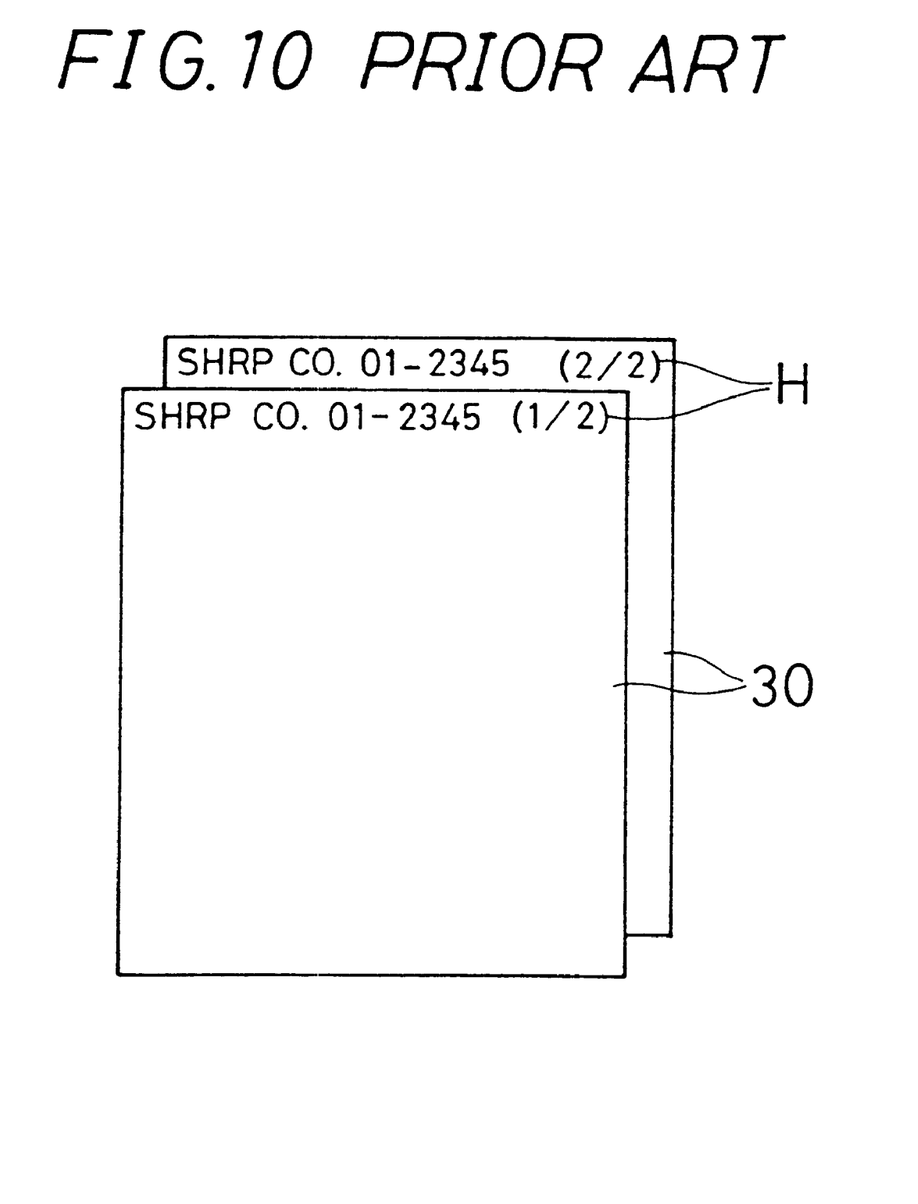
FIG. 10 shows recording sheets 30 on which header information H are printed by a prior art facsimile apparatus.

Conventionally, as one of the functions possessed by a facsimile apparatus, there has been a function of printing header information indicating a name, title, telephone number and others of an originator's terminal based on a facsimile response signal (Transmitting Subscriber Identification: TSI signal), composed of characters and numerals, on a margin of recording sheet in receiving a facsimile. FIG. 10 shows an example of header information H printed on recording sheet 30 in the conventional art.

Although the function of printing the header information is convenient to specify the originator, in order to discriminate the information received from a certain originator, it requires the user to recognize the header information by characters and to classify them and hence it is difficult to discriminate the received information quickly.

As a prior art, Japanese Unexamined Patent Publication JP-A 2-301259 (1990) discloses a facsimile apparatus which prints an index mark on a margin of recording sheet. It prints the index mark at position corresponding to a number of times of incoming calls by measuring the number of times in automatic response of the facsimile apparatus. Based on the position where the index mark is printed, the user can discriminate received information of one and same communication unit quickly and reliably. Such a technology is disclosed also in Japanese Unexamined Patent Publication JP-A 4-220864 (1992).

Japanese Unexamined Patent Publication JP-A 4-270548 (1992) discloses a facsimile apparatus which is capable of printing data indicating an originator (header information) in a different printing color per each communication type such as an emergency transmission and a confidential transmission. In concrete, originator indicating data having a printing color corresponding to a type of communication is added to color image data at the originator's terminal, then the color image data is transmitted. At the receiver's terminal, the originator indicating data having the specified printing color is printed together with the image data. The user can discriminate the type of the communication such as the emergency transmission and the confidential transmission based on the printed color of the originator indicating data.

According to the techniques disclosed in JP-A 2-301259 and JP-A-4-220864, an index mark is printed at position corresponding to a number of times of incoming calls. Accordingly, although it is easy to discriminate the received information of one and same communication unit, it is necessary to recognize the header information by characters after all in order to discriminate the received information from the same originator.

The technique of JP-A 4-270548 is what controls the type of communication such as the emergency transmission and the confidential transmission in the originator's terminal. Although the receiver can discriminate the received information of one and same communication type readily based on the printed color of the originator indicating data, the user has to recognized the originator indicating data (header information) by characters in the same manner as described above to discriminate the received information from one and same originator.

Japanese Unexamined Patent Publication JP-A 5-244364 discloses a facsimile apparatus which performs a printing process based on information produced on the receiving side. The information produced on the receiver side is information discriminably showing whether the receiving operation has been normal or abnormal for example.

SUMMARY OF THE INVENTION

It is an object of the invention to provide a facsimile apparatus, and an information printing method of the facsimile apparatus, which allows information received from one and same originator to be discriminated visually, quickly and readily without error.

In a first aspect of the invention, there is provided a facsimile apparatus comprising: color printing means; originator identification information detecting means for detecting identification information of an originator from received information including image information; a memory for prestoring identification information of originators in correspondence with printing colors; selecting means for selecting a printing color corresponding to the identification information detected by the originator identification information detecting means from the memory; and signal generating means for generating a printing signal which instructs to print the information in the selected printing color and giving the printing signal to the printing means.

According to the first aspect of the invention, the originator identification information detecting means detects the identification information of the originator in receiving a facsimile. Next, identification information which coincides with the detected identification information is selected out of the identification information of originators stored in the memory and the printing color corresponding to the identification information is selected. Next, the printing signal which instructs to print the information in the selected color is generated. Then, the information is printed. Accordingly, the information may be printed in the selected printing color.

In a second aspect of the invention, the facsimile apparatus further comprises: judging means for judging whether or not the received image information is black-and-white, and wherein the originator identification information detecting means detects the originator identification information from the received information when the received image information is judged as being black-and-white by the judging means.

According to the second aspect of the invention, the information may be printed in a selected printing color even when the received image information is black-and-white.

In a third aspect of the invention, it is preferable that the signal generating means generates a printing signal which instructs to print the received image information in the selected printing color as the printing signal, and the printing means prints the received image information based on the generated printing signal.

According to the third aspect of the invention, the originator identification information detecting means detects the identification information of the originator in receiving a facsimile. Next, identification information which coincides with the detected identification information is selected out of identification information of originators stored in the memory in advance and a printing color corresponding to the identification information is selected. Then, the printing signal which instructs to print the received image in the selected printing color is generated and the received image is printed based on the printing signal.

For instance, identification information of an originator's terminal A is detected from a facsimile response signal (TSI signal) and a monochromatic image is printed in a printing color Ma corresponding to the originator's terminal A in receiving a monochromatic facsimile from the originator's terminal A. The information transmitted from the terminal A may be discriminated by selecting the recording sheet on which the image of the printing color Ma is printed out of the mixed recording sheets. It is possible to select the recording sheet visually, readily and quickly without being required to recognize characters and without error because the information is distinguished by the colors.

In a fourth aspect of the invention, it is preferable that the signal generating means generates an index signal which instructs to print an index mark for discriminating the originator in the selected printing color as the printing signal, and the printing means prints the index mark based on the generated index signal, together with the received image information.

According to the fourth aspect of the invention, the originator identification information detecting means detects the identification information of the originator in receiving a facsimile. Next, the identification information which coincides with the detected identification information is selected among identification information of originators stored in the memory in advance and a printing color corresponding to that identification information is selected. Then, the index signal which instructs to print the index mark in the selected printing color is generated and based on that index signal, the index mark of the predetermined color is printed together with the image information.

For instance, the identification information of the originator's terminal A is detected from the facsimile response signal (TSI signal) in receiving a facsimile from the originator's terminal A and the index mark is printed in the printing color Ma corresponding to the originator's terminal A. The information transmitted from the terminal A may be discriminated by selecting the recording sheet on which the index mark of the printing color Ma is printed out of the mixed recording sheets. The recording sheet may be selected visually, readily and quickly without being required to recognize characters and without error because the information may be distinguished by the color.

It is also possible to arrange so as to indicate the index mark in a specific printing color when there is no identification information which coincides with the detected identification information in the identification information of the originators stored in the memory in advance. For instance, it is possible to arrange so as to print the index mark in the printing color Mc in receiving a facsimile from the originator's terminal C not stored in the memory in advance. The information transmitted from the terminal C may be readily discriminated because the recording sheet on which the index mark of the printing color Mc is printed may be selected out of the mixed recording sheets visually, readily and quickly without being required to recognize characters and without error.

In a fifth aspect of the invention, it is preferable that the signal generating means does not generate the printing signal when the printing color corresponding to the detected identification information cannot be selected from the memory.

According to the fifth invention, when the printing color corresponding to the detected identification information cannot be selected from the memory, i.e., when there is no identification information which coincides with the detected identification information in the identification information of originators stored in the memory in advance, no index mark is printed and only the received image information is printed. The information transmitted from the terminal not stored in advance may be discriminated readily because the recording sheet on which no index mark is printed may be selected out of the mixed recording sheets visually and quickly without error.

Further, according to the fifth invention, when the printing color corresponding to the detected identification information cannot be selected from the memory, i.e., when there is no identification information which coincides with the detected identification information in the identification information of originators stored in the memory in advance, the received image is printed in its color, e.g., in monochrome. Accordingly, the information transmitted from the terminal not stored in advance may be discriminated readily because the recording sheet on which the monochromatic image is printed may be selected out of the mixed recording sheets visually and quickly without being required to recognize characters and without error.

In a sixth aspect of the invention, there is provided an information printing method of a facsimile apparatus having a color printing function, comprising the steps of detecting originator identification information of an originator from received information including image information; selecting a printing color corresponding to the detected originator identification information from a memory in which identification information of originators are prestored in correspondence with printing colors; generating a printing signal which instructs to print the information in the selected printing color; and printing the information.

According to the sixth aspect of the invention, the identification information of the originator is detected in receiving a facsimile. Next, identification information which coincides with the detected identification information is selected out of identification information of originators stored in the memory and a printing color corresponding to the identification information is selected. Next, the printing signal which instructs to print the information in the selected printing color is generated. Then, the information is printed. Accordingly, the information may be printed in the selected printing color.

In a seventh aspect of the invention, it is preferable that the information printing method of a facsimile apparatus further comprises the step of judging whether or not the received image information is black-and-white, and in the step of detecting originator identification information, the originator identification information is detected from the received information when the received image information is judged as being black-and-white in the judging step.

According to the seventh aspect of the invention, it is judged in receiving a facsimile whether or not the received image information is black-and-white at first. When the received image information is black-and-white, the identification information of the originator is detected. Next, identification information which coincides with the detected identification information is selected out of identification information of originators stored in the memory and a printing color corresponding to that identification information is selected. Then, the printing signal which instructs to print the information in the selected printing color is generated. Then, the information is printed. Accordingly, the information may be printed by selecting the printing color even when the received image information is black-and-white.

In an eighth aspect of the invention, it is preferable that in the signal generating step, a printing signal which instructs to print the received image information in the selected printing color is generated as the printing signal, and in the printing step, the received image information is printed based on the generated printing signal.

According to the eighth aspect of the invention, the identification information of the originator is detected at first in receiving a facsimile. Next, identification information which coincides with the detected identification information is selected out of the identification information of the originators stored in the memory in advance and a printing color corresponding to the identification information is selected. Then, the printing signal which instructs to print the received image in the selected printing color is generated and the received image is printed based on the printing signal.

For instance, the identification information of the originator's terminal A is detected from the facsimile response signal (TSI signal) in receiving a monochromatic facsimile from the originator's terminal A and the monochromatic image is printed in the printing color Ma corresponding to the originator's terminal A. The information transmitted from the terminal A may be discriminated by selecting the recording sheet on which the image of the printing color Ma is printed out of the mixed recording sheets. The recording sheet may be selected visually, readily and quickly without being required to recognize characters and without error because the information may be distinguished by the color.

In a ninth aspect of the invention, it is preferable that in the signal generating step, an index signal which instructs to print an index mark for discriminating the originator in the selected printing color is generated as the printing signal; and in the printing step, the index mark based on the generated index signal is printed, together with the received image information.

According to the ninth aspect of the invention, the identification information of the originator is detected in receiving a facsimile. Next, the identification information which coincides with the detected identification information is selected out of identification information of originators stored in the memory in advance and the printing color corresponding to that identification information is selected. Then, the index signal which instructs to print the index mark in the selected printing color is generated and based on the index signal, the index mark of the predetermined color is printed together with the image information.

For instance, the identification information of the originator's terminal A is detected from the facsimile response signal (TSI signal) in receiving a facsimile from the originator's terminal A and the index mark is printed in the printing color Ma corresponding to the originator's terminal A. The information transmitted from the terminal A may be discriminated by selecting the recording sheet on which the index mark of the printing color Ma is printed out of the mixed recording sheets. The recording sheet may be selected visually, readily and quickly without being required to recognize characters and without error because the information may be distinguished by the color.

It is also possible to arrange so as to indicate the index mark in a specific printing color when there is no identification information which coincides with the detected identification information in the identification information of the originators stored in the memory in advance. For instance, it is possible to arrange so as to print the index mark in the printing color Mc in receiving a facsimile from the originator's terminal C not stored in the memory in advance. The information transmitted from the terminal C may be readily discriminated because the recording sheet on which the index mark of the printing color Mc is printed may be selected out of the mixed recording sheets visually, readily and quickly without being required to recognize characters and without error.

In a tenth aspect of the invention, it is preferable that in the signal generating step, the printing signal is not generated when the printing color corresponding to the detected identification information cannot be selected from the memory.

According to the tenth aspect of the invention, when the printing color corresponding to the detected identification information cannot be selected from the memory, i.e., when there is no identification information which coincides with the detected identification information in the identification information of originators stored in the memory in advance, no index mark is printed and only the received image information is printed. The information transmitted from the terminal not stored in advance may be discriminated readily because the recording sheet on which no index mark is printed may be selected out of the mixed recording sheets visually and quickly without error.

Further, according to the tenth aspect of the invention, when the printing color corresponding to the detected identification information cannot be selected, i.e., when there is no identification information which coincides with the detected identification information in the identification - information of originators stored in the memory in advance, the received image is printed in its color, e.g., in monochrome. Accordingly, the information transmitted from the terminal not stored in advance may be discriminated readily because the recording sheet on which the monochromatic image is printed may be selected out of the mixed recording sheets visually and quickly without being required to recognize characters and without error.

BRIEF DESCRIPTION OF THE DRAWINGS

Other and further objects, features, and advantages of the invention will be more explicit from the following detailed description taken with reference to the drawings wherein.

DETAILED DESCRIPTION OF THE PREFERRED EMBODIMENTS

Now referring to the drawings, preferred embodiments of the invention are described below.

Figure 1:
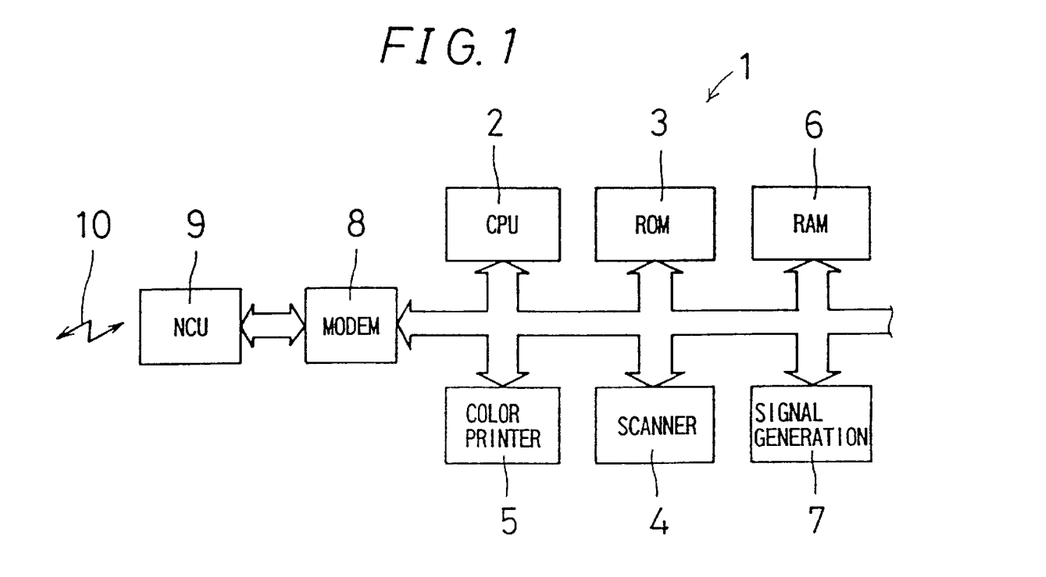
FIG. 1 is a block diagram showing a facsimile apparatus 1 having a color printing function according to one embodiment of the invention.

FIG. 1 is a block diagram showing a facsimile apparatus 1 having a color printing function according to one embodiment of the invention. A CPU (Central Processing Unit) 2 in the facsimile apparatus 1 controls operations of the whole apparatus including an image reading operation and an image printing operation in accordance with a program stored in a ROM (Read Only Memory) 3 connected therewith. In the image reading operation, the CPU 2 controls the operation of a scanner 4 connected therewith so that an original image is scanned by the scanner 4 to be converted into image information, i.e., electrical signals. In the image printing operation, it controls the operation of a color printer 5 connected therewith so that the transmitted image information is printed on a recording sheet to reproduce the original image.

The CPU 2 also functions as originator identification information detecting means for detecting identification information of the originator from the received information in receiving a facsimile. In concrete, it detects identification information specifying the originator such as the name, title, telephone number and others of the originator from the facsimile response signal (TSI signal) every time when an incoming call is made.

Figure 2:
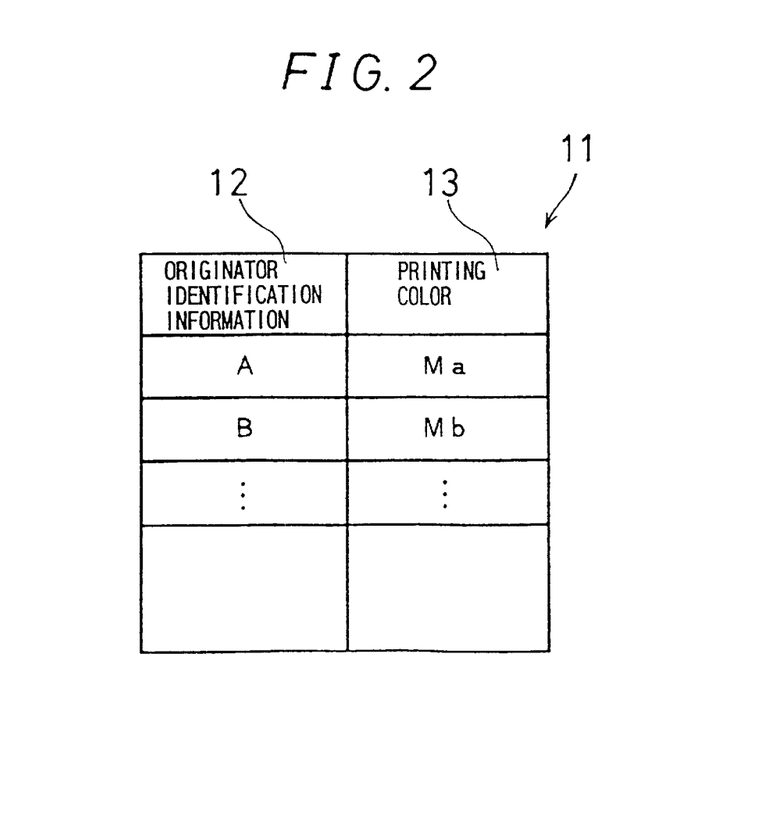
FIG. 2 shows a printing color table 11 stored in a RAM 6.

A printing color table 11 shown in FIG. 2 is stored in a RAM (Random Access Memory) 6 connected to the CPU 2. Identification information 12 of originators is stored in correspondence to printing colors 13 in the printing color table 11 in advance. Here, printing colors Ma, Mb, . . . are stored in correspondence to terminals A, B, . . . of the originators.

The CPU 2 also functions as selecting means for selecting the identification information 12 which coincides with the identification information detected as described above from the printing color table 11 and the corresponding printing color 13 from the printing color table 11.

A signal generating circuit 7 connected with the CPU 2 generates an index signal which instructs to print an index mark for identifying the originator in the selected printing color 13. The CPU 2 controls the operation of the color printer 5 so as to print the image information contained in the received information and the index mark on the recording sheet based on the index signal.

A modem 8 connected with the CPU 2 modulates/demodulates information for the communication so as to adapt to a public telephone line network 10. An NCU (Network Control Unit) 9 connected with the modem 8 sends out a dialing signal to the public telephone line network 10 and responses to a call signal incoming from the public telephone line network 10.

Figure 3:
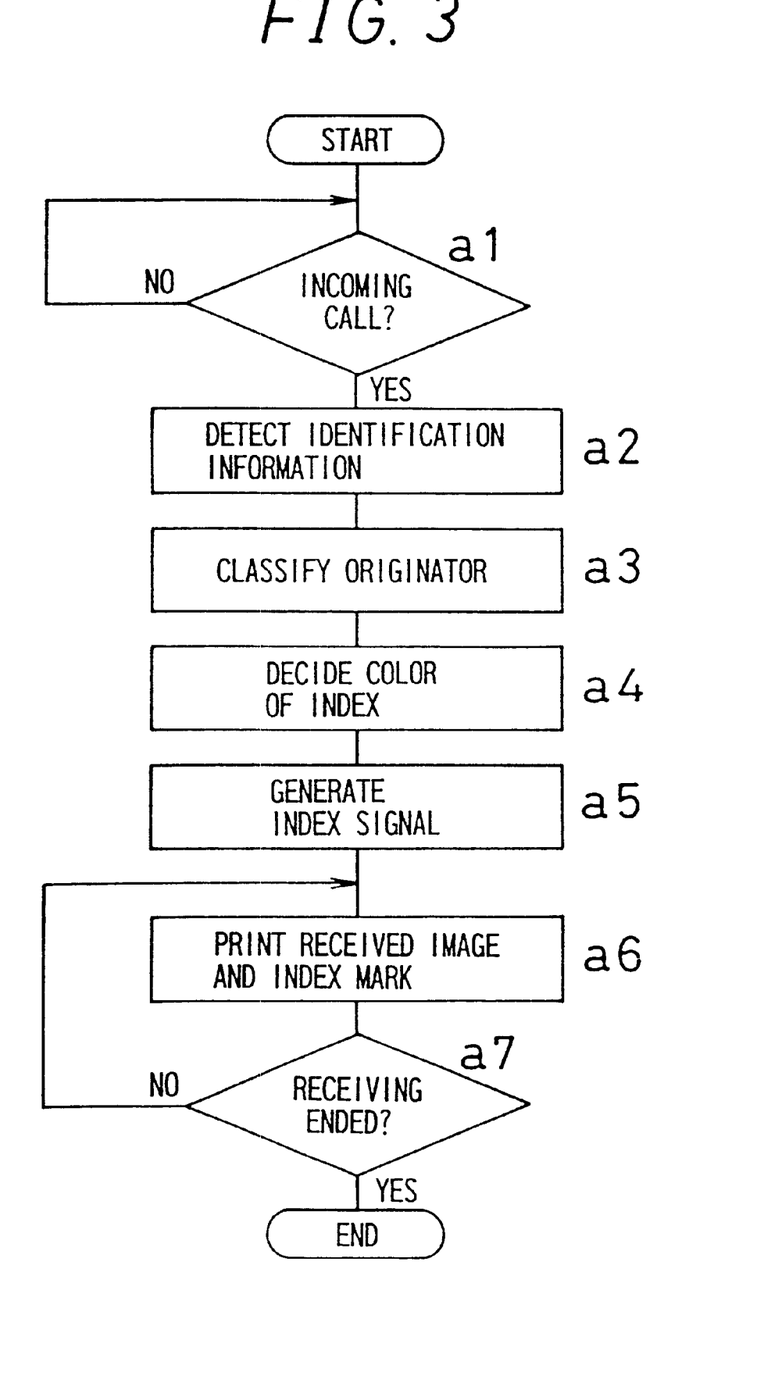
FIG. 3 is a flowchart explaining an operation for printing an index mark of the facsimile apparatus 1.

FIG. 3 is a flowchart explaining the operation for printing the index mark of the facsimile apparatus 1. The apparatus monitors an incoming call from another facsimile apparatus in Step a1 and when a call signal comes in and the apparatus detects the incoming call, the process advances to Step a2 to detect identification information. The apparatus selects identification information 12 which coincides with the detected identification information by making reference to the printing color table 11 in Step a3. Then, the process advances to Step a4 to select a printing color 13 corresponding to the coincident identification information 12.

For example, when the originator's terminal found by the identification information 12 coincident with the detected identification information is A, Ma is selected as the printing color and when it is B, Mb is selected as the printing color. It is also possible to arrange such that a specific color Mc is selected as the printing color when no identification information 12 coincident with the detected identification information is stored in the printing color table 11.

The process advances to Step a5 in succession to generate an index signal which instructs to print an index mark in the selected printing color. In the next Step a6, the index mark is printed on the recording sheet based on the index signal together with the received image information printed. The printing operation of Step a6 is executed until when the end of receiving is detected in Step a7 and when the end of receiving is detected, the operation for printing the index mark ends.

Figure 4A:
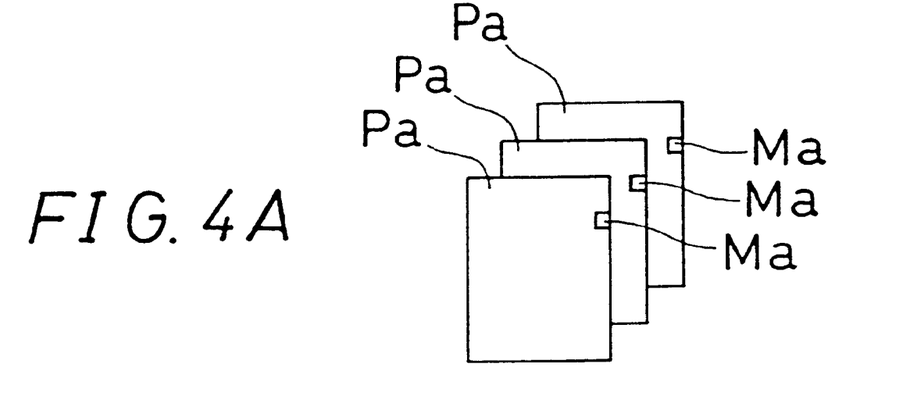
FIGS. 4A through 4C show recording sheets Pa on which the index marks are printed based on the flowchart in FIG. 3.
Figure 4B:
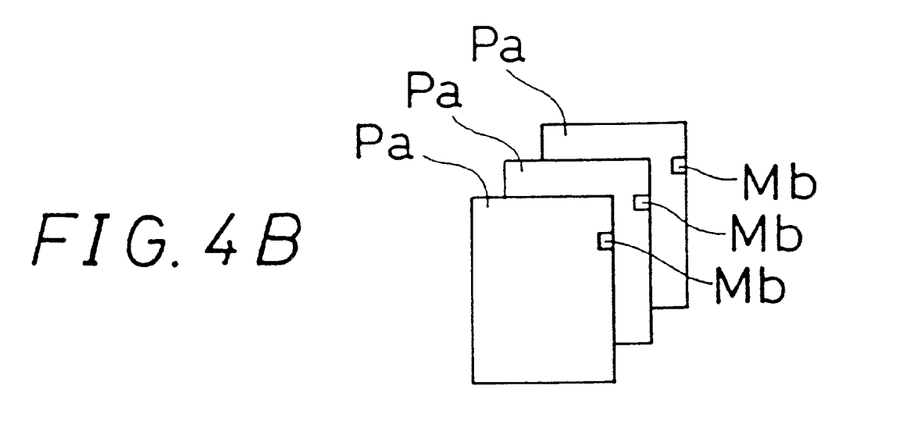
Figure 4C:
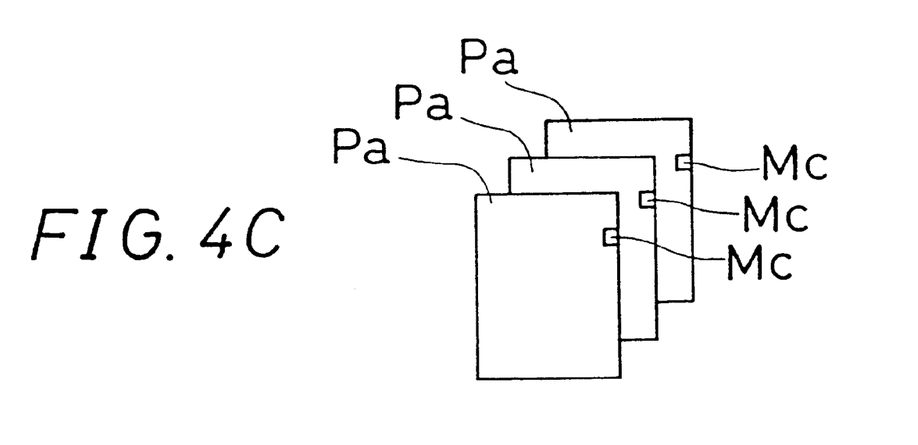

In this way, the index marks of the same color are printed on the recording sheets Pa of one and same communication unit as shown in FIGS. 4A through 4C. FIG. 4A shows the recording sheets Pa of one and same communication unit whose originator's terminal is A and on which the index mark is printed in the printing color Ma, FIG. 4B shows the recording sheets Pa of one and same communication unit whose originator's terminal is B and on which the index mark is printed in the printing color Mb and FIG. 4C shows the recording sheets Pa of one and same communication unit whose originator's terminal is C which is not stored in the printing color table 11 and on which the index mark is printed in the printing color Mc.

Accordingly, it is possible to discriminate the information transmitted from the terminal A by selecting the recording sheets Pa on which the index mark whose printing color is Ma is printed for example among the mixed recording sheets Pa. The same applied also to the terminal B. It is possible to select the recording sheets Pa readily, visually, quickly and without recognizing by characters and without error because the information may be distinguished by the color.

It is also possible to select the recording sheets Pa on which the index mark whose printing color is Mc is printed among the mixed recording sheets Pa visually and readily and to discriminate information transmitted from the terminal C even when the index mark is printed in the specific printing color Mc in receiving a facsimile from the originator's terminal C which is not stored in the printing color table 11 in advance.

Figure 5:
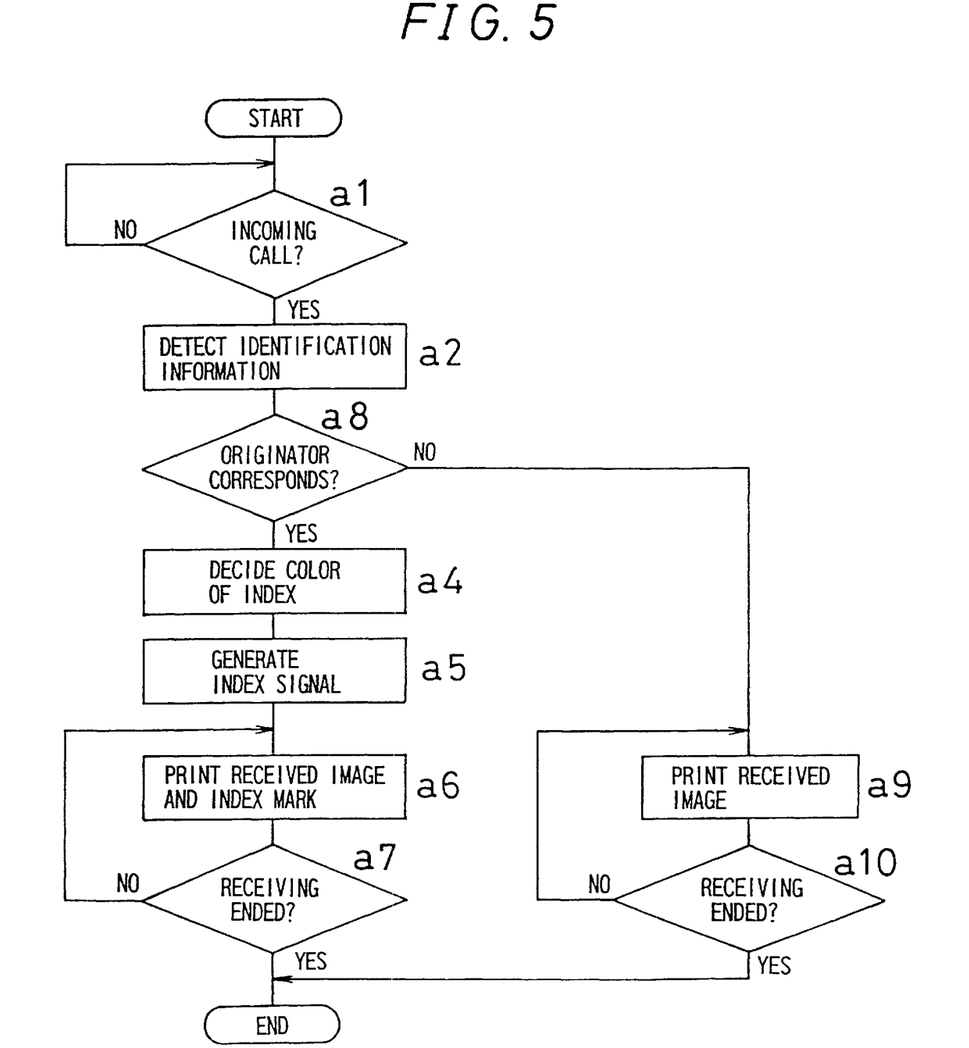
FIG. 5 is a flowchart explaining another operation for printing the index mark of the facsimile apparatus 1.

FIG. 5 is a flowchart explaining another operation for printing the index mark of the facsimile apparatus 1. In the flowchart, Steps a8 through a10 are added instead of Step a3 in the flowchart in FIG. 3. When the apparatus monitors and detects an incoming call from the other facsimile apparatus in Step a1, it detects identification information in Step a2. It then judges in Step a8 whether or not the identification information 12 which coincides with the detected identification information exists by making reference to the printing color table 11. When the identification information 12 exists, the apparatus executes the operations of Steps a4 through a7 described above. When there is no identification information 12, the process advances to Step a9 to print only the received image information on the recording sheet. The apparatus executes the printing operation of Step a9 until when it detects the end of receiving in Step a10 and ends the operation for printing the index mark when it detects the end of receiving.

Figure 6A:
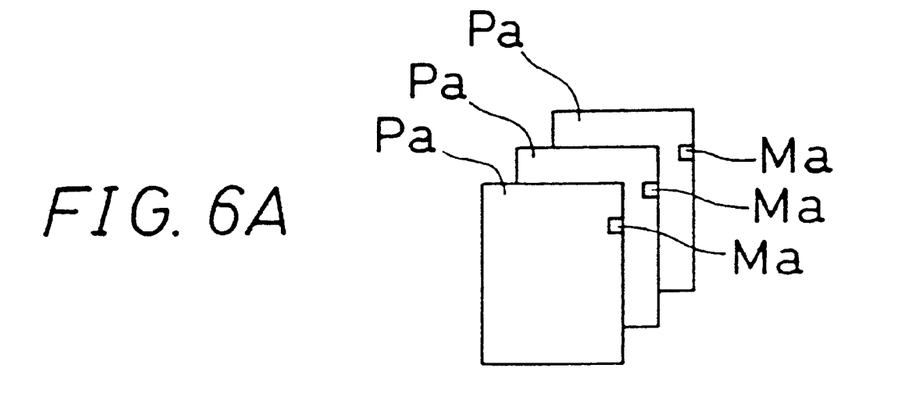
FIGS. 6A through 6C show recording sheets Pa on which the index marks are printed based on the flowchart in FIG. 5.
Figure 6B:
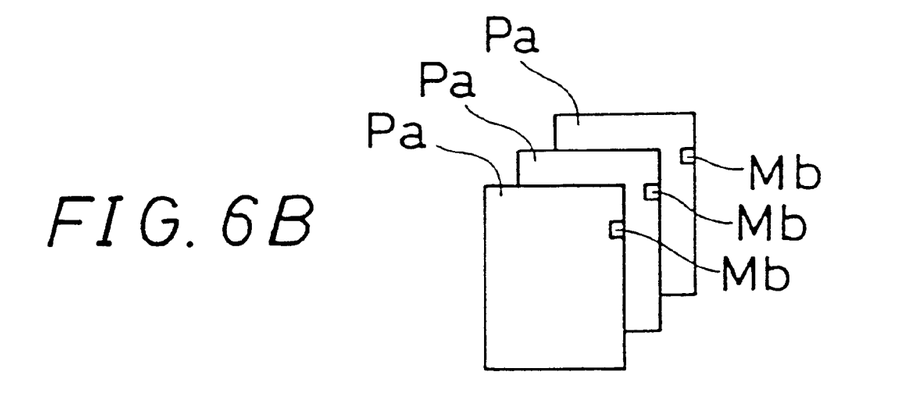
Figure 6C:
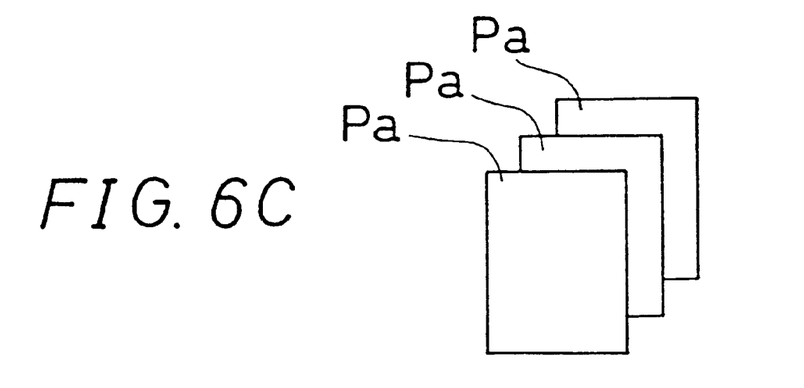

In this way, the index mark of the same printing color Ma is printed on the recording sheets Pa of one and same communication unit when the originator's terminal is A which is stored in the printing color table 11 as shown in FIGS. 6A through 6C. When the terminal is B, the index mark of the same printing color Mb is printed. When the originator's terminal is C which is not stored in the printing color table 11, no index mark is printed. FIG. 6A shows the recording sheets Pa of one and same communication unit whose originator's terminal is A and on which the index mark is printed in the printing color Ma, FIG. 6B shows the recording sheets Pa of one and same communication unit whose originator's terminal is B and on which the index mark is printed in the printing color Mb and FIG. 6C shows the recording sheets Pa of one and same communication unit whose originator's terminal is C which is not stored in the printing color table 11 and on which no index mark is printed.

Accordingly, it is possible to discriminate the information transmitted from the terminal C not stored in advance because the recording sheets Pa on which no index mark is printed may be selected among the mixed recording sheets Pa visually, quickly and without recognizing characters and without error.

Next, a facsimile apparatus according to another embodiment of the invention will be explained. The facsimile apparatus of the present embodiment is constructed almost in the same manner as the facsimile apparatus 1 in FIG. 1. The CPU 2 judges in receiving the facsimile whether or not an image contained in received information is monochromatic image. It judges that the image contained in the received information is a monochromatic image in receiving from a monochromatic facsimile apparatus for example. The facsimile apparatus of the present embodiment may be used suitably in receiving a monochromatic image. It may be used suitably also in a facsimile apparatus having a color copying function, though it receives images in monochrome.

The signal generating circuit 7 generates a printing signal which instructs to print the monochromatic image in the printing color 13 selected in the same manner with the above-mentioned facsimile apparatus. Based on the printing signal, the CPU 2 controls the operation of the color printer 5 so as to print image information contained in the received information on the recording sheet. The printing signal is what the incoming monochromatic image information is converted into information of a specific printing color based on the color discriminating data. The signal generating circuit 7 which generates such printing signal conducts digital computing process of multiplication by a predetermined coefficient and addition on each color information of Y (Yellow), M (magenta) and C (cyan). The printing color is controlled by the control of the CPU 2 by converting the incoming color image information and the monochromic image information into image information having concentration suitable for the printing capability of the color printer 5.

Figure 7:
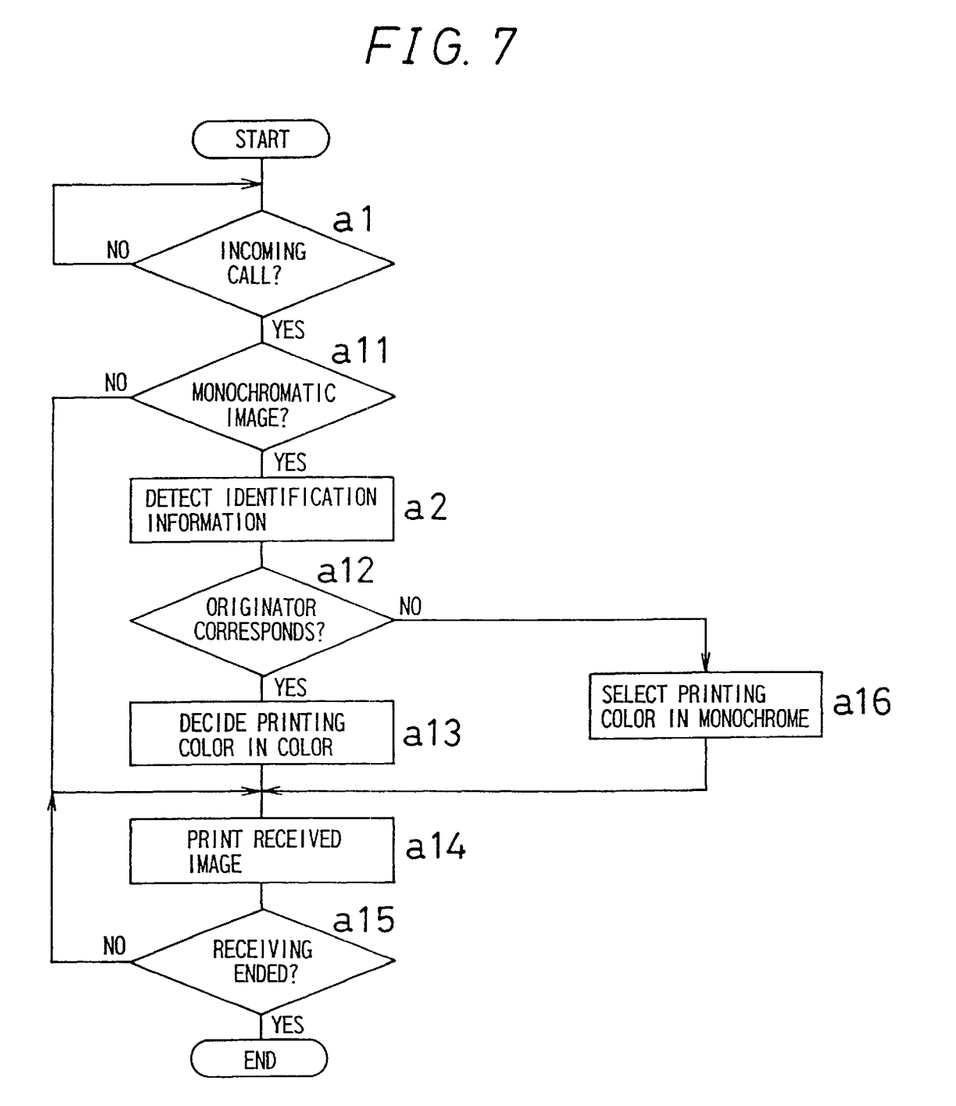
FIG. 7 is a flowchart explaining an operation for printing image information of a facsimile apparatus having a color printing function according to another embodiment of the invention.

FIG. 7 is a flowchart explaining another operation for printing the image information of the facsimile apparatus 1. Steps a11 through a16 are added in this flowchart instead of Steps a3 through a7 of the flowchart in FIG. 3. The apparatus monitors a call incoming from another facsimile apparatus in Step a1 and when a call signal comes in and the apparatus detects the incoming call, the process advances to Step a11 to judge whether or not the received image is a monochromatic image. When it is a monochromatic image, the process advances to Step a2 to detect the identification information. When it is not a monochromatic image, the process advances to Step a14.

When the identification information is detected in Step a2, the process advances to Step a12 to judge whether or not the identification information 12 which coincides with the detected identification information exists by making reference to the printing color table 11. When there exists the coincident identification information 12, the process advances to Step a13 to decide the printing color 13 corresponding to the identification information 12 as the printing color of the monochromatic image received. When there is no identification information 12 which coincides with the detected identification information in Step a12, the process advances to Step a16 to print the received monochromatic image as it is in monochrome. That is, the printing color is decided to be monochrome.

When the printing color is decided in Steps a13 and a16 and the image received in Step a11 is not a monochromatic image, the received monochromatic image is printed on the recording sheet in a predetermined printing color in Step a14. When the received image is not a monochromatic image, that image is printed as it is, i.e., in color. The printing operation in Step a14 is executed until when the end of receiving is detected in Step a15 and when the end of receiving is detected, the image printing operation ends.

Figure 8A:
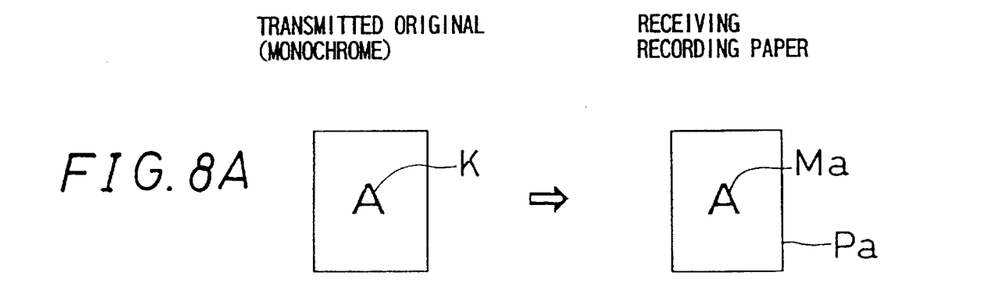
FIGS. 8A through 8C show recording sheets Pa on which the images are printed based on the flowchart in FIG. 7.
Figure 8B:
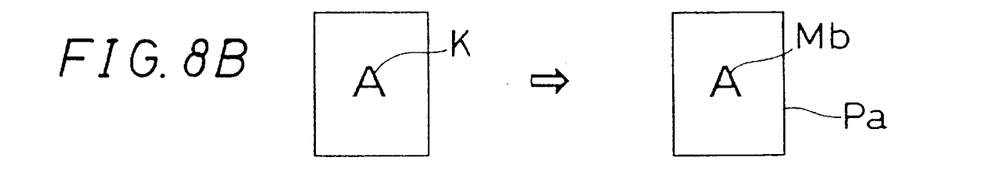
Figure 8C:
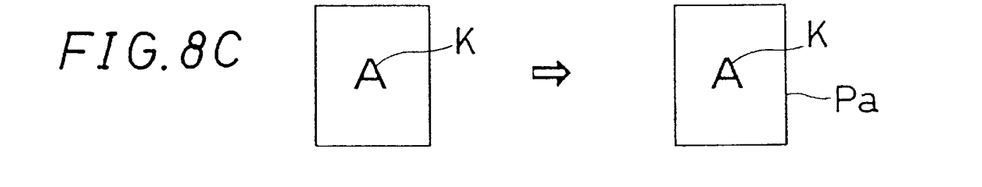

In this way, the image in the same color is printed on the recording sheets Pa of one and same communication unit as shown in FIGS. 8A through 8C. FIG. 8A shows the recording sheets Pa of one and same communication unit on which a monochromatic image from the originator's terminal A is printed in a predetermined printing color Ma which is not monochrome and FIG. 8B shows the recording sheets Pa of one and same communication unit on which a monochromatic image from the originator's terminal B is printed in a predetermined printing color Mb which is not monochrome. FIG. 8C shows the recording sheets Pa of one and same communication unit on which a monochromatic image from the originator's terminal C not stored in the printing color table 11 is printed in a monochromatic printing color K.

Accordingly, it is possible to discriminate the information transmitted from the terminal A by selecting the recording sheets Pa on which the image is printed in the printing color Ma among the mixed recording sheets Pa. The same applies also to the terminal B. Because the information may be distinguished by the colors, the recording sheets Pa may be readily selected visually and quickly without requiring to recognize characters and without error.

Further, because the apparatus is arranged so as to print the image in a printing color at the receiving time, i.e., in monochrome, in receiving a facsimile from the originator's terminal C not stored in the printing color table 11 in advance, the recording sheet Pa on which the image is printed in the monochromatic printing color K may be readily selected out of the mixed recording sheets Pa and the information transmitted from the terminal C may be discriminated.

Figure 9:
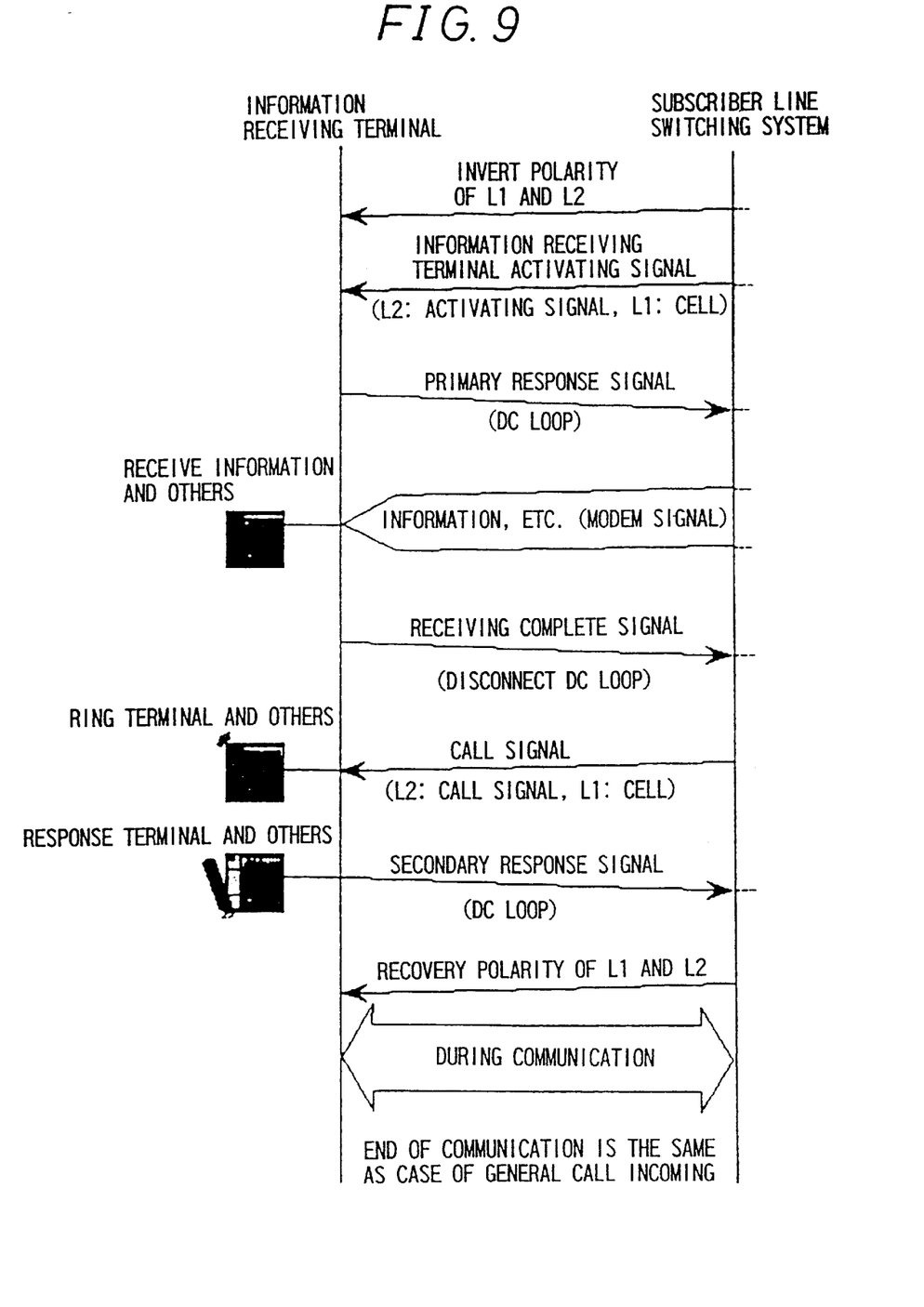
FIG. 9 shows a sequence of an operation for connecting a pre-communication information notifying service.

It is noted that although the case of using the originator identification information detected from the facsimile response signal (TSI signal) has been explained as the method for discriminating the originator, cases of discriminating the originator by methods other than that will be included in the scope of the present invention. For instance, it is possible to arrange so as to discriminate the originator from information such as a telephone number by receiving a so-called pre-communication information notifying service of providing information such as the telephone number of the originator's terminal to the receiver's terminal before the communication via a contract line at the time when a call is incoming as shown in a connecting operation sequence in FIG. 9 for example.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A facsimile apparatus comprising:

color printing means;

originator identification information detecting means for detecting identification information of an originator from received information including image information;

a memory for prestoring identification information of originators in correspondence with printing colors;

selecting means for selecting a printing color corresponding to the identification information detected by the originator identification information detecting means from the memory; and signal generating means for generating a printing signal which instructs to print the information in the selected printing color and giving the printing signal to the printing means.

2. The facsimile apparatus of claim 1, further comprising:

judging means for judging whether or not the received image information is black-and-white, wherein
   the originator identification information detecting means detects the originator identification information from the received information when the received image information is judged as being black-and-white by the judging means.

3. The facsimile apparatus of claim 1, wherein the signal generating means generates a printing signal which instructs to print the received image information in the selected printing color as the printing signal, and the printing means prints the received image information based on the generated printing signal.

4. The facsimile apparatus of claim 1, wherein the signal generating means generates an index signal which instructs to print an index mark for discriminating the originator in the selected printing color as the printing signal, and the printing means prints the index mark based on the generated index signal, together with the received image information.

5. The facsimile apparatus of claim 1, wherein the signal generating means does not generate the printing signal when the printing color corresponding to the detected identification information cannot be selected from the memory.

6. An information printing method of a facsimile apparatus having a color printing function, comprising the steps of:

detecting originator identification information of an originator from received information including image information;

selecting a printing color corresponding to the detected originator identification information from a memory in which identification information of originators is prestored in correspondence with printing colors;

generating a printing signal which instructs to print the information in the selected printing color; and printing the information.

7. The information printing method of a facsimile apparatus of claim 6, further comprising the step of:

judging whether or not the received image information is black-and-white, wherein in the step of detecting originator identification information, the originator identification information is detected from the received information when the received image information is judged as being black-and-white in the judging step.

8. The information printing method of a facsimile apparatus of claim 6, wherein in the signal generating step, a printing signal which instructs to print the received image information in the selected printing color is generated as the printing signal, and in the printing step, the received image information is printed based on the generated printing signal.

9. The information printing method of a facsimile apparatus of claim 6, wherein in the signal generating step, an index signal which instructs to print an index mark for discriminating the originator in the selected printing color is generated as the printing signal, and in the printing step, the index mark based on the generated index signal is printed, together with the received image information.

10. The information printing method of a facsimile apparatus of claim 6, wherein in the signal generating step, the printing signal is not generated when the printing color corresponding to the detected identification information cannot be selected from the memory.

* * * * *